Jan. 14, 1936.  C. R. ALDEN  2,027,360
FUEL INJECTION SYSTEM
Filed March 19, 1930   7 Sheets-Sheet 1

Fig. 1

Inventor
Carroll R. Alden
By Chindahl, Parker + Carlson

Jan. 14, 1936.  C. R. ALDEN  2,027,360

FUEL INJECTION SYSTEM

Filed March 19, 1930  7 Sheets-Sheet 2

Inventor
Carroll R. Alden
By Chindahl, Parker + Carlson
Attys.

Jan. 14, 1936.  C. R. ALDEN  2,027,360
FUEL INJECTION SYSTEM
Filed March 19, 1930  7 Sheets-Sheet 3

Inventor
Carroll R. Alden
By Chindahl, Parker & Carbarry
Attys.

Jan. 14, 1936.                C. R. ALDEN                 2,027,360
                         FUEL INJECTION SYSTEM
                       Filed March 19, 1930          7 Sheets-Sheet 5

Inventor
Carroll R. Alden
By Chindahl, Parker & Carlson
Attys.

Patented Jan. 14, 1936

2,027,360

UNITED STATES PATENT OFFICE 2,027,360

FUEL INJECTION SYSTEM

Carroll R. Alden, Detroit, Mich., assignor to Ex-Cell-O Aircraft & Tool Corporation, Detroit, Mich., a corporation of Michigan Application March 19, 1930, Serial No. 437,056

21 Claims. (Cl. 123—32)

The present invention relates to improvements in fuel injection systems for internal combustion engines.

Various objects of the invention reside in the provision of a novel fuel injection system in which fluid pressure actuated valves are employed instead of mechanically operated valves, thereby eliminating the springs, cams, cam followers and lost motion connections, commonly employed in prior systems; in which wear between coacting parts is substantially eliminated, thus obviating the necessity for adjustment and replacement of parts to compensate for wear; and in which there is a material reduction in the number, size, weight and cost of the coacting parts.

Other objects of the invention reside in a new and improved fuel injection system in which no high degree of precision in the manufacture of the coacting parts is required for satisfactory operation, in which the initial cost is low, and in which maintenance involves little attention or expense.

Various general objects reside in the provision of a novel fuel injection system which is practically noiseless in operation, which enables operation at unusually high speeds, which is highly responsive, certain and efficient in performance, and which is subject to a high degree of precision and sensitiveness in control.

Another object is to provide a new and improved fuel injection system comprising an injection valve adapted to be subjected at opposed ends to fluid pressure from a single source, and distributor means for controlling the supply of fluid pressure in a manner such that in each sequence of operation like pressures first are impressed against opposite ends of the valve, then the pressure at one end is momentarily reduced to permit opening of the valve, and finally the pressure at the other end is reduced to permit closing of the valve.

A further object resides in the provision of such control means which is operable to effect only a partial reduction in the closing pressure, for example from 25% to 40% of the maximum, to induce opening of the valve, and which further is operable to reestablish the pressure before closing of the valve as a preparatory step to insure quick and positive closing of the valve upon a reduction in the opposing pressure.

Another object is to provide a novel fuel injection system in which a single distributor or control means is provided for a plurality of valves, in which said means is adjustable to effect a synchronous change in the occurrence or the duration of injection for all valves, and in which said adjustment may be accomplished while the engine is in operation.

Still another object resides in the provision of a novel injection system having sets of distributor passages respectively, for supplying fuel to the discharge ends of a plurality of injection valves in timed sequence and for quickly exhausting the pressure after cut-off of the fuel supply, and for effecting pressure reduction impulses at the outer ends of the valves in timed sequence and also in timed relation to the supply of fuel.

Further objects and advantages will become apparent as the description proceeds.

In the accompanying drawings.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present system of fuel injection is adapted for use in various types of internal combustion engines. However, for purposes of illustration, I have shown in the drawings and will herein describe the system as applied to a Diesel engine for which it is particularly suitable.

The system comprises generally a plurality of injection nozzles, at least one for each engine cylinder, a source of fuel under a substantially constant pressure, and a control unit for the nozzles operable in timed relation to the rotation of the crank shaft and effective through control of the nozzles to meter the respective charges of fuel and time the occurrence thereof in a given cycle.

Referring more particularly to the drawings, the specific fuel injection system, constituting the exemplary embodiment of the invention, is provided for a two-cycle Diesel engine having four cylinders of which only one is shown. Each cylinder comprises a cylinder body 10 open at one end and closed at the other end by a removable cylinder head 11. A suitable piston 12 is slidably disposed in the cylinder 10, and is connected through a rod 13 to the engine crank shaft 14. The piston 12 is so disposed in the cylinder 10 that at the end of the compression stroke, a high degree of compression will be obtained in the initially small combustion space 15 underlying the cylinder head 11.

Four fuel injection nozzles 16, 17, 18 and 19, one for each cylinder, are provided. Each nozzle is mounted to discharge a jet of fuel into the combustion space 15 over a predetermined controllable period of each cycle. Since the nozzles are alike in construction, a detailed description of the nozzle 16 will suffice for all.

Preferably, the nozzle 16 is mounted in the head 11 to discharge centrally into the upper end of the combustion space 15. To this end, the head 11 is formed centrally with a chamber 20 opening therethrough and adapted to house the nozzle. The inner end of the chamber 20 is formed with a peripheral flange 21 which defines a central opening 22 and of which the outer surface is inclined toward the opening to define a conical seat 23 for the nozzle.

The nozzle 16 in its preferred form (see Figs. 2 and 3) comprises an inner tip section 24 and an outer plug section 25. The inner end of the section 24 is conical in form to coact with the seat 23, and preferably has a central injection point 26 projecting through the opening 22 slightly into the combustion space 15. The outer end of the section 24 is formed with a central cylindrical boss 27, the outer peripheral edge of which seats against a beveled edge 29 in the inner end of the plug section 25. A plurality of screws 30 extend through countersunk openings 31 in the tip section 24 into threaded engagement with the plug section 25 to secure the sections rigidly in assembled relation.

Figure 2:
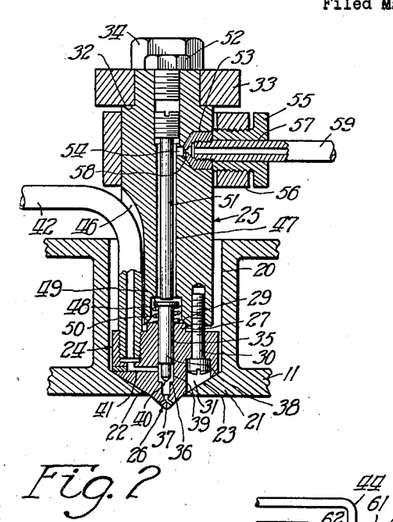
Fig. 2 is an enlarged axial sectional view of one of the injection nozzles.
Figure 3:
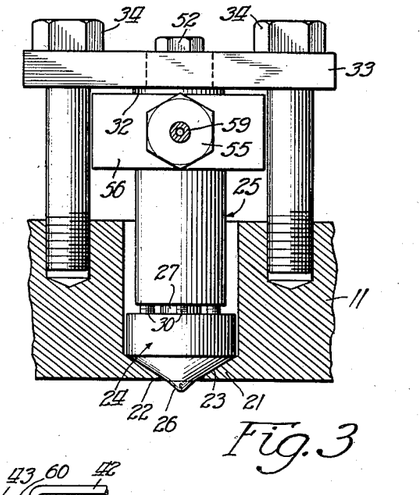
Fig. 3 is a side elevational view of the nozzle.
Figure 4:
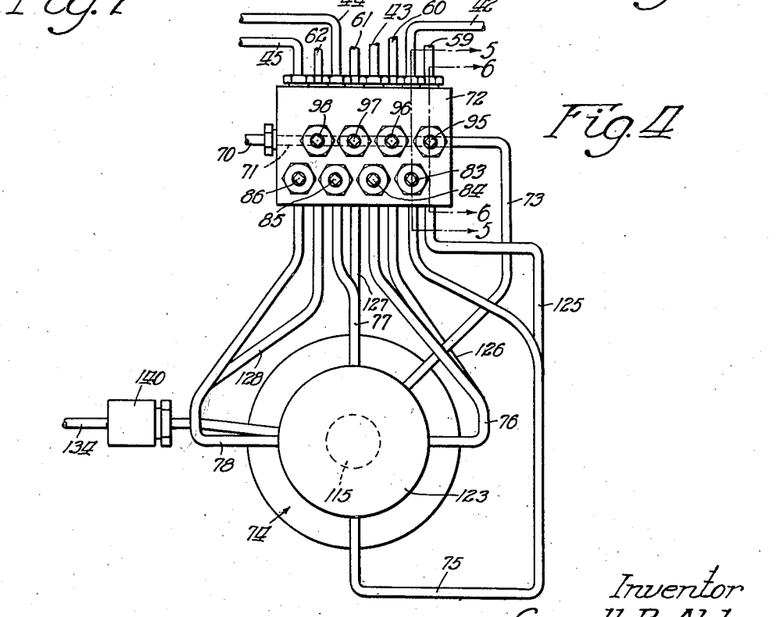
Fig. 4 is a fragmentary plan view on an enlarged scale of the distributor and its tube connections.
Figures 5, 6:
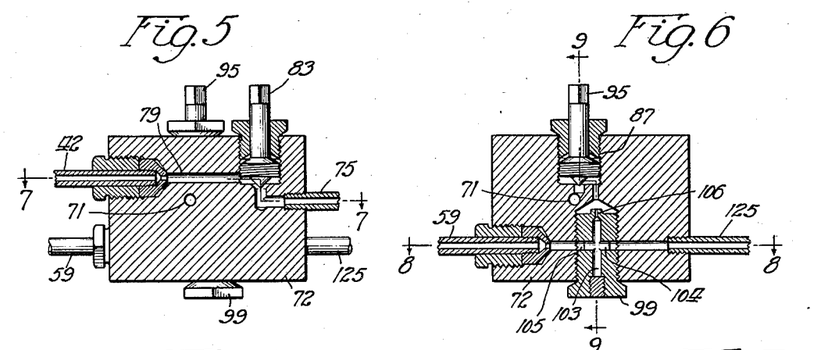
Fig. 5 is a transverse sectional view of the tube connecting block for the distributor taken along line 5—5 of Fig. 4.
Fig. 6 is a view similar to Fig. 5 taken along line 6—6 of Fig. 4.
Figure 7:
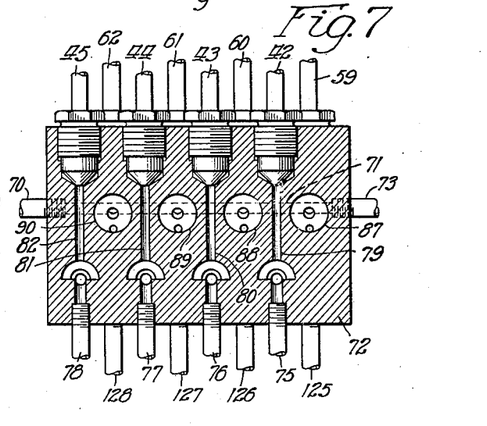
Fig. 7 is a sectional view taken along line 7—7 of Fig. 5.
Figure 8:
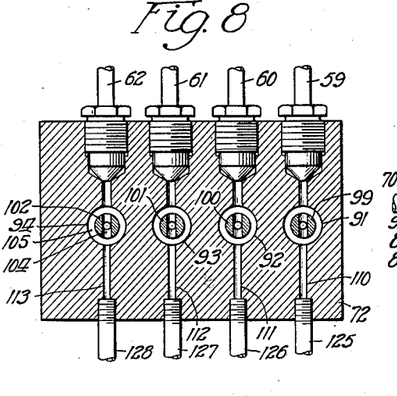
Fig. 8 is a sectional view taken along line 8—8 of Fig. 6.
Figure 9:
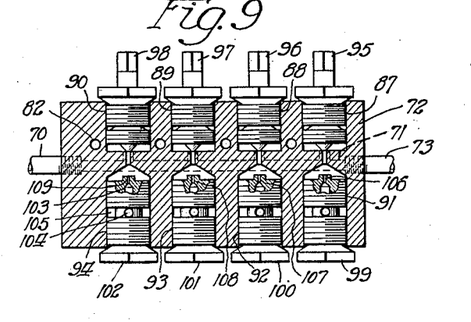
Fig. 9 is a sectional view taken along line 9—9 of Fig. 6.

The plug section 25 projects beyond the head 11, and the free outer end thereof is reduced in size to define an annular shoulder 32. A clamping plate 33 centrally apertured to receive the reduced end of the section 25 is tightly clamped against the shoulder 32 by means of two screw bolts 34 at opposite ends threaded into the cylinder head 11. Thus, the assembled nozzle 16 is clamped securely in the chamber 20 against the seat 23.

The tip section 24 is formed with an axial bore 35 opening through the boss 27 to the outer end. The inner end of the bore 35 is reduced in size to define a shoulder, the peripheral edge of which constitutes a valve seat 36. Opening from the reduced inner end of the bore 35 through the nozzle point 26 is a restricted fuel discharge orifice or duct 37 which preferably is branched laterally to discharge a plurality of fuel jets into the space 15. It is to be understood, however, that any suitable form of fuel jet adapted to satisfy requirements of combustion spaces 15 of various shapes may be provided.

A valve plunger 38 is slidably mounted in the bore 35, and the inner end thereof is reduced in size to constitute the inner end of the bore or valve chamber 39. Formed on the inner end of the plunger 38 is a pointed or tapered valve 40 adapted to coact with the valve seat 36. A passage 41 formed in the tip section 24 opens to the side of the chamber 39, and is in free communication with the discharge end of a fuel feed tube 42 leading from a suitable source of fuel supply. Similar feed tubes 43, 44 and 45 are provided respectively for the nozzles 17, 18 and 19. Preferably, the feed tube 42 is threaded into the outer end of the tip section 24, and extends out of the chamber 20 through a longitudinal groove 46 formed in the side of the plug section 25.

The plug section 25 also is formed with an axial bore 47 which opens therethrough, and of which the inner end is enlarged to form a pressure chamber 48, and the outer end is tapped. The valve plunger 38 extends into the chamber 48, and hence is responsive to the pressure therein. Preferably, the outer end of the plunger 38 is formed with a peripheral flange 49, and is encircled by a coil spring 50 in end abutting engagement with the boss 27 and the flange 49. A stop pin 51 is adjustably threaded into the outer end of the bore 47, and extends in freely spaced relation therethrough into the chamber 48 for engagement by the plunger 38. A cap screw 52 is threaded into the outer end of the bore 47. The stop pin 51 serves to limit the upward movement of the valve plunger 38, and is adjustable upon removal of the cap screw 52 to vary the maximum range of movement of the plunger. This adjustment can be made while the engine is in operation and without necessitating any change in the other units of the system. The cap screw 52 serves to prevent leakage of fuel past the threads of the pin 51.

Formed in the side of the plug section 25 is a recess 53, the inner end of which defines a conical seat and opens through a central connecting port 54 to the bore 47. A fitting having a conical inner end engaging the conical seat is snugly disposed in the recess 53, and is tightly clamped therein by means of a screw collar 55 in adjustable threaded engagement with a collar 56 encircling the plug section 25. The collar 55 is formed with an axial bore 57. The discharge end of a control tube 59 connected to a suitable source of pressure fluid extends through the bore 57, and is threaded into the fitting, and the inner end of the latter is formed with a port 58 effecting communication between the tube and the port 54. Similar tubes 60, 61 and 62 are provided respectively for the nozzles 17, 18 and 19.

In the operation of the nozzle, the entire outer end area of the plunger 38 is always exposed to the pressure in the chamber 48. The inner end area is fully exposed to the pressure in the chamber 39 when the valve 40 is open, but is reduced by the area embraced by the valve seat 36 when the valve is closed. Thus, assuming that equal pressures are impressed through the tubes 42 and 59, the valve 40 if closed will remain closed due to the differential pressure acting on the valve.

Upon a sufficient reduction in the pressure impressed through the tube 59, the valve 40 will open, thereupon immediately exposing the entire inner end area of the plunger to the pressure in the chamber 39. If now the pressure in the tube 59 is reestablished, the opposing pressures will be balanced, but the valve 40 will continue to remain open due to the pressure of the spring 50. However, upon reducing the pressure in the tube 42, the valve 40 will again close, thereby reestablishing the differential pressure relation tending to maintain the valve closed. The pressure of the spring 50 is weak relative to the fuel pressure acting on the differential area, which is equal to the area embraced by the valve seat, and hence will not be effective to open the valve.

Fuel is supplied through the tube 42 to the nozzle at a substantially constant pressure during injection. The metering of the charge thus is determined by the period of time that the nozzle is open. The start of injection is coincident with reduction in pressure in the tube 59 below that in the tube 42. The end point of injection is coincident with the subsequent reduction in pressure in the tube 42 below that in the tube 59. Thus, the occurrence and metering of the charge are dependent on the control of the pressures in the two tubes 42 and 59.

Figure 1:
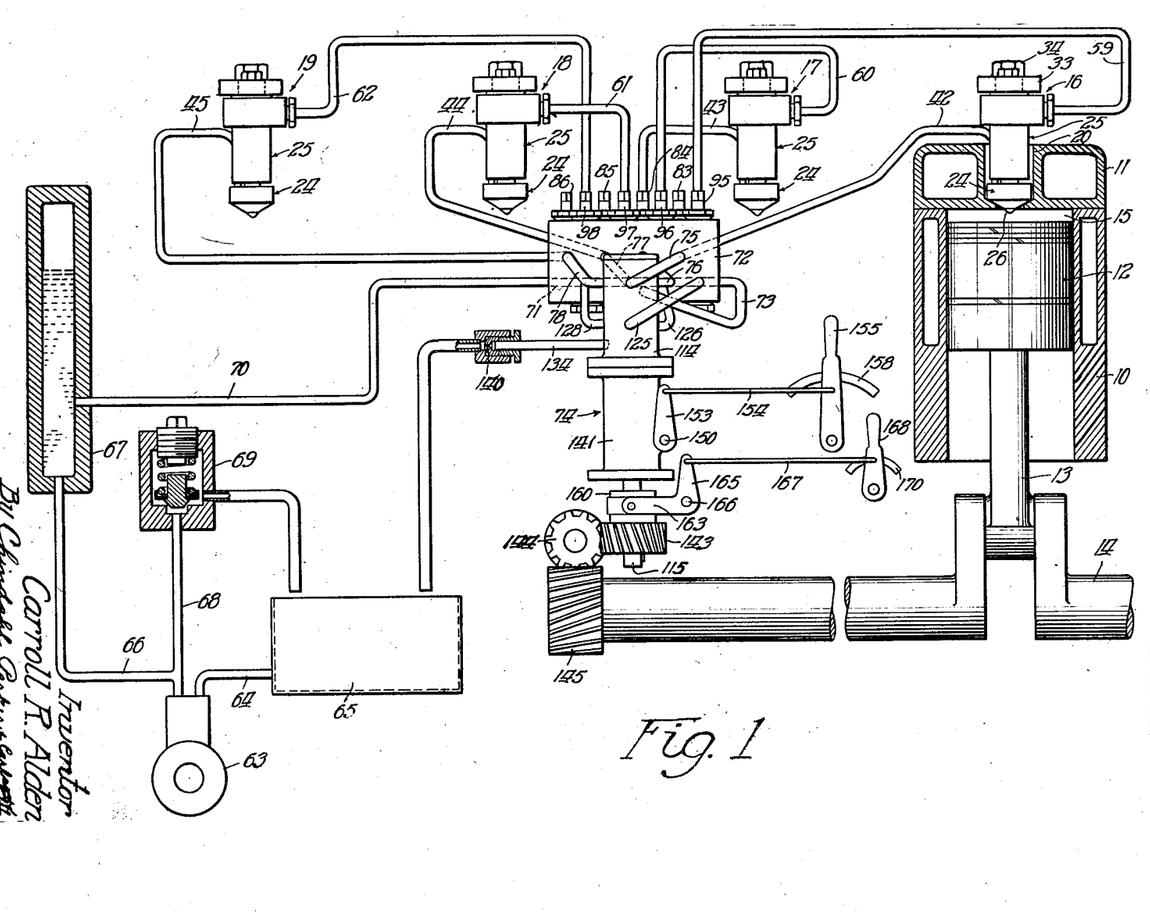
Figure 1 is a diagrammatic representation of a fuel injection system embodying the features of my invention.

Fuel under a substantially constant pressure may be supplied to the feed tube 42 from any suitable source. In the present instance, a suitable fuel pump 63 driven by power from any suitable source (not shown) takes fuel through a suction line 64 from a fuel supply tank 65, and discharges the fuel at a high pressure through a line 66 to a fuel accumulator 67. The specific construction of the pump 63 per se forms no part of the present invention, and hence is not disclosed herein. The accumulator 67 is provided in the form of a closed pressure container. Branching from the line 66 is a line 68 including a pressure relief valve discharging to the supply tank 65. The valve 69 is set to maintain a predetermined pressure, for example 10,000 pounds per square inch, in the accumulator.

Opening from the accumulator 67 at a point below the liquid fuel level is a main high pressure feed line 70 which is adapted to be suitably connected in timed sequence during the successive periods of fuel injection through the nozzles to the respective feed tubes 42 to 45.

In the present instance, the discharge end of the line 70 is connected to one end of a bore 71 opening through a connection block 72. A pipe 73 in effect a continuation of the pipe 70 is connected at its inlet end to the other end of the bore 71, and at its discharge end to a fluid distributor indicated generally at 74. Four feed lines 75, 76, 77 and 78 lead from the distributor 74 and are connected through the block 72 to the feed lines 42 to 45 of which they are in effect continuations. More specifically, the block 72 is formed with four transverse passages 79, 80, 81 and 82 to the opposite ends of which the lines 42 to 45 and 75 to 78 are respectively connected by means of suitable fittings. Interposed in the passages 79 to 82 are four valves 83, 84, 85 and 86 respectively whereby the supply of fuel to any nozzle may be cut off.

Any suitable pressure fluid from any suitable source may be impressed through the tubes 59 to 62. Preferably, fuel from the accumulator 67 is utilized. To this end, the block 72 is formed with four valve chambers 87, 88, 89 and 90 opening to the bore 71, and also in communication with four chambers 91, 92, 93 and 94. Suitable valves 95, 96, 97 and 98 control the passage of pressure fluid from the bore 71 into the chambers 87 to 90.

Orifice plugs 99, 100, 101 and 102 are threaded into and close the chambers 91 to 94. Each plug is formed with an axial bore 103 and an intersecting transverse bore 104 opening at its ends to a peripheral groove 105 in the exterior. The inner ends of the bores 103 in the respective plugs 99 to 102 are restricted to define orifices 106, 107, 108 and 109 opening to the chambers 91 to 94. Four transverse bores 110, 111, 112 and 113 are formed in the block 72, and open to the chambers 91 to 94 into communication with the annular grooves 105. The inlet ends of the control lines 59 to 62 are connected respectively to the bores 110 to 113 by means of suitable fittings. Thus, the main feed line 70 is connected through four composite passages, valve controlled and including the restricted orifices 106 to 109, to the individual control lines 59 to 62.

The distributor 74 constitutes means for controlling the pressures in the feed tubes and the control tubes to effect operation of the nozzles in timed relation to the rotation of the engine crank shaft 14, and to distribute fuel to the feed tubes during the respective periods of injection, and is adjustable to vary the occurrence and period or duration of injection. While any suitable control means may be provided, in the present instance, the distributor is of the rotary type (see Fig. 10) comprising an outer cylindrical casing 114, and a rotor 115 disposed therein for rotary operation to effect timed sequential charges and for axial adjustment to vary the metering of the charges.

Figure 10:
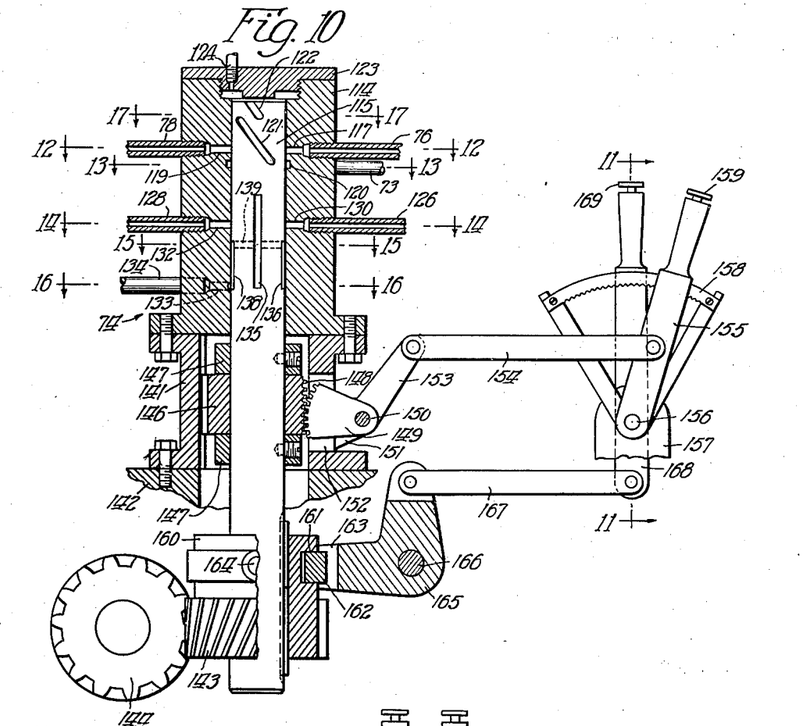
Fig. 10 is an enlarged axial sectional view of the distributor.

The inlet ends of the feed tubes 75, 76, 77 and 78 open to the interior of the casing 114 respectively, through equally spaced peripheral feed ports 116, 117, 118, and 119 formed therein.

Figure 12:
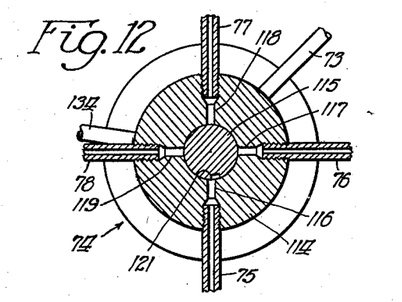
Figs. 12 to 17 are transverse sectional views of the distributor taken respectively along lines 12—12, 13—13, 14—14, 15—15, 16—16 and 17—17 of Fig. 10.
Figure 13:
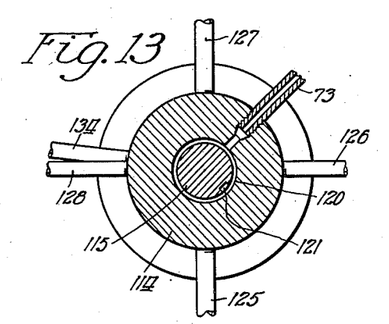

Preferably, these ports are arranged in the same transverse plane (see Fig. 12). The main feed line 73 opens through the side of the casing 114 to a continuous peripheral groove 120 formed in the interior of the casing in a transverse plane adjacent the plane of the feed ports 116 to 119 (see Fig. 13).

Formed in the periphery of the rotor 115 is a longitudinally inclined recess 121 which is always in communication with the groove 120, and which is effective upon rotation of the rotor to establish successive communication of the groove 120 with the feed ports 116 to 119. It will be evident that upon axial adjustment of the rotor 115, the opening and the cut-off of the feed ports 116 to 119 will be advanced or retarded relative to the rotation of the crank shaft 14. The duration of any one period of injection at each nozzle is determined by the interval between the instant of pressure reduction in the related control tube and the variable instant of cut-off of the related feed tube. In the present illustration, the duration of injection varies from maximum to zero as the rotor 115 is adjusted downwardly.

Thus, when the upper end of the inclined recess 121 is adjusted into the plane of the ports 116 to 119 for movement into successive communication therewith, the duration of injection is short and but a small amount of fuel is injected. Under such condition, which exists during idling operation, it is desirable to dissipate the pressure in each feed tube immediately after it is cut off from the fuel supply.

Hence, a second recess 122, which is parallel to and spaced rearwardly of the recess 121, and which slightly overlaps the upper end of the latter is formed in the rotor 115. The recesses 121 and 122 are spaced apart just sufficiently to prevent any one of the ports 116 to 119 from being in communication with both simultaneously. The bleeder recess 122 may be vented to any suitable exhaust, and in the present instance opens to the upper end of the rotor 115. For convenience, the ports 116 to 119 and the recesses 121 and 122 are therefore located near the upper end of the distributor 74. The upper end of the casing 114 which is closed by a removable cover 123 opens through a suitable line 124 to the exhaust.

The distributor 74 is also utilized as a means to bleed pressure fluid from the control tubes 59 to 62, in sequence and during intervals timed to the rotation of the crank shaft 14, at a rate faster than the supply of pressure fluid through the respective orifices 106 to 109 so as to effect successive pressure reductions in the control tubes.

Figure 14:
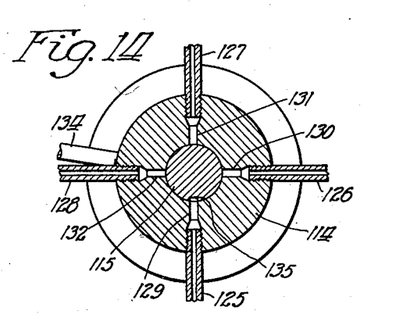
Figure 16:
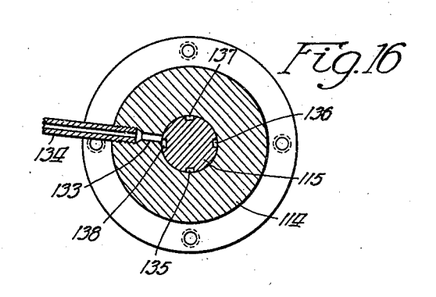
Figure 17:
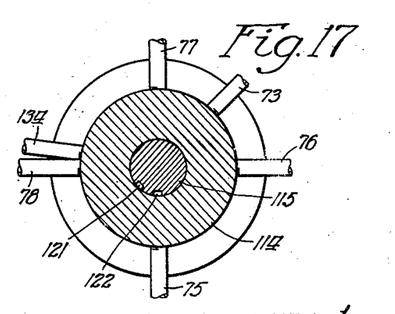

To this end, by-pass tubes 125, 126, 127 and 128 are connected at their inlet ends to the bores 110 to 113 in the block 72, and thus are always in communication with the control tubes 59 to 62. The tubes 125 to 128 open to the interior of the casing 114 respectively through equally spaced peripheral ports 129, 130, 131 and 132 formed therein. Preferably, these ports are arranged in the same transverse plane (see Fig. 14). Formed in the inner periphery of the casing 114 in a transverse plane spaced from that of the ports 129 to 132 is a drain port 133 (see Fig. 16) which is connected to a drain line 134 discharging to the supply tank 65.

Figure 15:
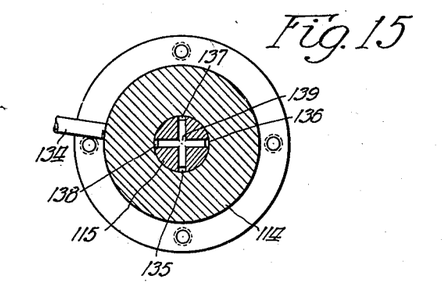

A plurality of equally spaced longitudinal recesses 135, 136, 137 and 138 are formed in the periphery of the rotor 115, and are in intercommunication through a branched duct or passage 139 (see Fig. 15) formed in the rotor. The recesses 135 to 138 are in the same transverse plane, and are of such a length and so located longitudinally of the rotor that upon rotation of the latter in any position of axial adjustment, they will be moved successively into and out of communication with the drain port 133.

One of the recesses 135 to 138 for example the recess 135, is extended in length at one end to project through the plane of the control ports 129 to 132, and is adapted upon rotation of the rotor 115 in any position of axial adjustment to be moved successively into and out of communication with the control ports. It will be evident that when the recess 135 is open to one of the control ports 129 to 132, and one of the recesses 136 to 138 is open to the drain port 133, the control port in question will be vented to the drain and a drop in pressure in the connected control tube will result.

Preferably, means is provided for preventing a pressure drop to zero or a pressure drop substantially greater than necessary for the efficient operation of the system in the control tubes 59 to 62 upon selective venting to the drain. To this end, a suitable pressure restriction means, such for example as a pressure reducing orifice 140, is interposed in the drain line 134. The orifice 140 preferably is larger than any one of the orifices 106 to 109, but not necessarily so. When pressure fluid is allowed to escape through the orifice 140, fluid will flow through one of the orifices 106 to 109 at that particular time in series therewith, and this flow will result in a drop in the control tube pressure. Sub-dividing the pressure results in that after the drain cut-off, the maximum control pressure can be quickly established, thus providing a sensitive and highly responsive control permitting extremely high engine speeds.

The casing 114 is removably secured on a cylindrical housing 141 in turn removably secured to a suitable support 142, and one end of the rotor 115 extends from the casing through the housing and the support for a suitable drive connection with the crank shaft 14. This connection is shown as comprising a spiral gear 143 slidably splined to the rotor 115 and meshing with a spiral gear 144. The latter also meshes with a spiral gear 145 driven by the crank shaft 14.

A sleeve 146 within the housing 141 is secured on the rotor 115 for relative rotation. Two collars 147 rigidly clamped to the rotor 115 in end abutting engagement with the sleeve 146 serve to hold the latter against relative endwise movement. The sleeve 146 is splined to the housing 141 for axial movement with the rotor 115, and is formed along one side with a longitudinal gear rack 148.

Figure 11:
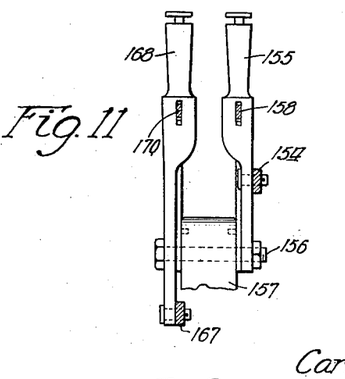
Fig. 11 is a sectional view of the adjusting mechanism for the distributor taken along line 11—11 of Fig. 10.

A gear sector 149 secured to a shaft 150 journalled in a bracket 151 on the outside of the housing 141 extends through a longitudinal slot 152 in the latter into mesh with the gear rack 148. Any suitable means, either manual or governor actuated, may be provided for adjusting the sector 149 to adjust the rotor 115 axially. Herein, I have shown a manual means comprising an arm 153 secured to the shaft 150 and pivotally connected at its free end to one end of a link 154. The other end of the link 154 is pivotally connected to a control lever 155 pivotal on a stud 156 projecting through a suitable support 157. Preferably, a suitable ratchet sector 158 is rigidly secured on the stud 156 at one side of the support 157, and the lever 155 is provided with a manually releasable spring-pressed detent 159 for engaging said sector to maintain the rotor 115 in axial position of adjustment.

Thus, the rotor 115 may be adjusted axially to vary the occurrence of the opening of the feed tubes 42 to 45 to the fuel source relative to the crank shaft movement. The angular phase relation between the venting of the control tubes 59 to 62 to the exhaust and the rotation of the crank shaft 14 is unaffected by this adjustment, and may be constant over the entire range of engine operation from closed throttle condition to full load condition.

The angular phase relation between the crank shaft 14 and the rotor 115, however, may be adjusted when desired by adjusting the spiral gear 143 axially relative to the gear 144, movement in one direction (upwardly) serving to retard the point of injection, and movement in the opposite direction (downwardly) serving to advance the point of injection. The gear 143 has a hub 160 formed with a peripheral groove 161 in which a ring 162 is rotatably disposed. A yoke 163 pivotally engages trunnions 164 on the ring 162, and is formed on one arm of a bell-crank lever 165 pivotal on a stud 166. The other arm of the lever 165 is connected through a link 167 to one end of a control lever 168 pivoted intermediate its ends on the stud 156. The other end of the lever 168 constitutes a handle having a manually releasable spring pressed detent 169 for engaging a ratchet sector 170 mounted on the support 157 to hold the gear 143 in position of adjustment.

The operation will now be described by reference to Figs. 18 to 24.

Figure 18:
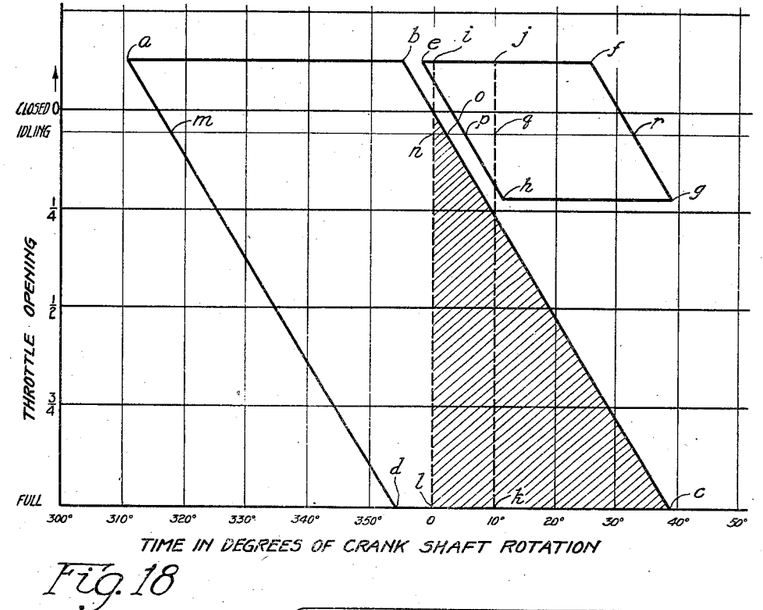
Fig. 18 is a time chart showing the relation of the feed tube opening to the fuel source, the feed tube opening to the bleed, the period of pressure reduction in the control tube, and hence the period of fuel injection, to degrees of crank shaft rotation for all axial positions of adjustment of the rotor over the entire range of operation.

Fig. 18 is a time chart in which the degrees of throttle opening, i. e. the axial adjustment of the rotor 115 from closed throttle to full open throttle, are plotted along the ordinate, and in which the degrees of crank shaft rotation including any period of fuel injection are plotted along the abscissa. The area *a—b—c—d* represents the recess 121, the feed tube opening to the fuel source along line *a—d*, the feed tube cut-off occurring along line *b—c*, and any abscissa between said lines indicating the duration of feed tube opening in degrees of crank shaft rotation. The area *e—f—g—h* represents the recess 122, the feed tube opening to this recess along the line *e—h* and moving out of communication therewith along line *f—g*.

The area *i—j—k—l* represents the period of pressure reduction in the control tube, the pressure being reduced along line *i—l* and being reestablished along line *j—k*. It will be understood that the invention is not limited to the specific relation of these areas to the degrees of crank shaft rotation. The phase relation is subject to adjustment through manipulation of the lever 168 so as to effect fuel injection at any desired point in the piston cycle.

Figure 19:
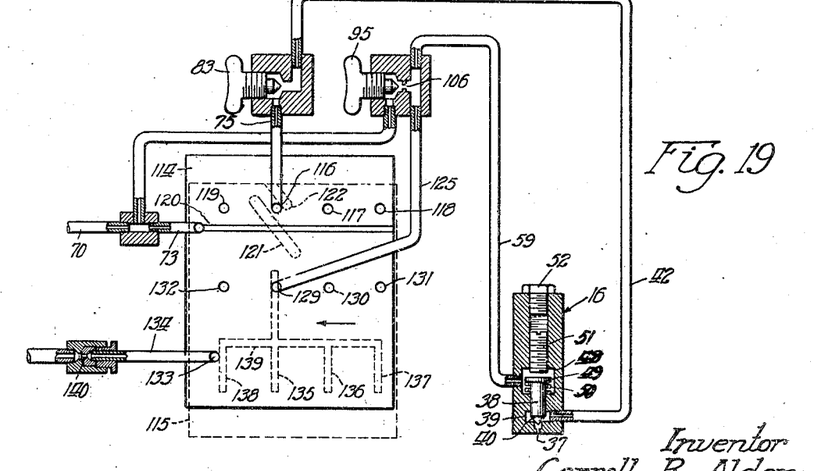
Fig. 19 is a fragmentary diagrammatic view of the system showing a development of the distributor casing, the tube connections thereto including one of the injection nozzles, and a development of the rotor in dotted outline superimposed on the development of the casing with the latter adjusted axially for closed throttle condition.
Figure 20:
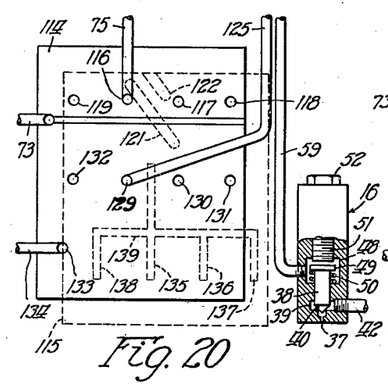
Fig. 20 is a view similar to Fig. 19 with the parts adjusted axially for idling throttle operation and showing the feed tube about to open to the fuel source.
Figure 21:
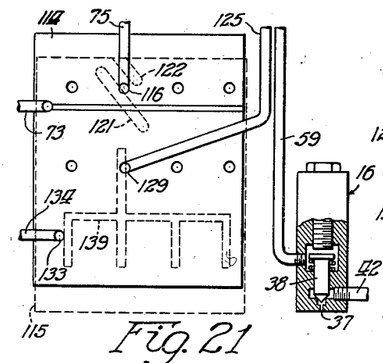
Fig. 21 is a view similar to Fig. 20 showing the pressure reduction orifice about to open to the drain shortly before the cut-off of the feed tube to initiate fuel injection.
Figure 22:
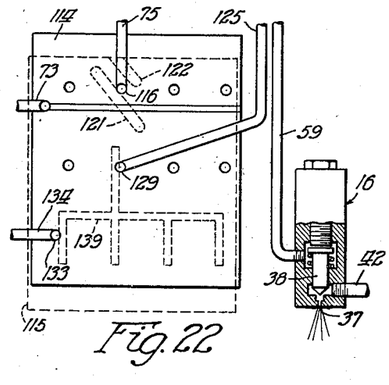
Fig. 22 is a view similar to Fig. 20 showing the parts in position to effect fuel injection.
Figure 23:
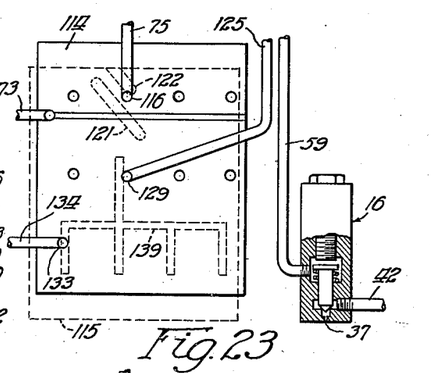
Fig. 23 is a view similar to Fig. 20 showing the parts in position after the end of the fuel injection and with the feed tube vented to the pressure bleed.

In Fig. 19, the rotor 115 is shown adjusted axially into its lowermost position beyond closed throttle condition. Assuming movement of the rotor 115 in the direction of the arrow (Fig. 19), the recess 121 will move into communication with the port 116 at *a* (311°) thereby connecting the feed tube 42 to the fuel source. The valve 40, however, will not open since the differential area, which is equal to the area embraced by the valve seat 36, is acted on by the pressure in the control tube 59, the pressures at this time in the tubes 42 and 59 being equal. Subsequently, the elongated recess 135 will open to the port 129. However, the pressure in the control tube 59 will not be reduced since the port 133 is still closed. At *b* (356°) the port 116 will be closed thereby cutting off the feed tube 42 from the fuel source, but trapping fuel therein at the pressure of the fuel source. The period during which the feed tube 42 is open is represented by the line *a—b*. Thereafter, at *e* (358°) the recess 122 will open to the port 116 thereby causing the trapped pressure to be dissipated.

At *i* (upper dead center—0°) the recess 138 will open to the drain port 133, and since the recess 135, which is connected to the port 133 through the passage 139 is still open to the port 129, pressure fluid will bleed from the control tube 59. The pressure fluid will bleed past the orifice 140 more rapidly than pressure fluid from the full source can pass through the orifice 106, and hence a pressure reduction will occur in the tube 59. However, since the fuel pressure is not impressed through the line 42 at this time, the valve 40 will remain closed. Subsequently, at *j* (10°) the port 129 will be closed, thereby causing the original pressure in the tube 59 to be reestablished. At *f* (26°), the recess 122 will move out of communication with the port 116. The operation is the same for each of the other nozzles 17, 18 and 19 excepting for successive phase differences of 90°.

Figs. 20 to 23 show the corresponding sequence for idling throttle. Upon movement of the rotor 115 in the direction of the arrow, the recess 121 will open to the port 116 (see Figs. 18 and 20) at *m* (318°). At *n* (0°), the recess 138 will open to the port 133 (see Fig. 21), thereby resulting in a pressure reduction in the control tube 59 sufficient to overcome the differential pressure initially acting to keep the valve 40 closed. Thereupon, the fuel pressure in the tube 42 will raise the valve 40 to inject fuel into the cylinder 10 (see Fig. 22).

The port 116 will be closed at *o* (2°) to cut-off the supply of fuel to the nozzle. The pressure in the tube 42 will rapidly fall to a point below the reduced pressure in the tube 59 to effect closure of the valve 40. At *p* (5°), the recess 122 will open to the port 116 thereby venting the pressure in the tube 42 (see Fig. 23) to insure positive closing of the valve 40. It will be evident that fuel is injected only over a very small period of time, i. e. along the line *n—o*. The action is of such short duration that the valve 40 is returned to its seat 36 before it has had time to reach its uppermost limit of movement defined by the adjustable pin 51. The recess 135 moves out of communication with the port 129 at *q* (10°) to reestablish the pressure in the tube 59, and the recess 122 leaves the port 116 at *r* (33°) to disconnect the tube 42 from the bleed.

Figure 24:
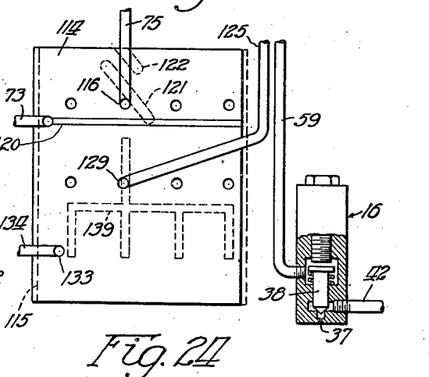
Fig. 24 is a view similar to Fig. 19 with the parts adjusted axially for full open throttle operation, and showing the feed tube about to open to the fuel source.

Fig. 24 shows the corresponding sequence for full throttle. In this instance, the recess 121 will open to the port 116 at *d* (354°), and the recess 138 will open to the drain port 133 at *l* (0°). Thereupon, the valve 40 will open and injection will commence.

The recess 135 will leave the port 129 at *k* (10°) to reestablish the pressure in the control tube 59. However, the valve 40 will not close at this time since the pressure at the opposite ends of the valve plunger 38 and the areas against which they act are equal, and the spring 50 thus is effective to hold the valve from floating into closed position. The recess 121 will leave the port 116 at *c* (38°) thereby cutting off the supply of fuel to the tube 42. Since the pressure in the tube 59 has been reestablished, the valve 40 will close quickly. It will be evident that fuel is injected over a relatively long period of time, i. e.

along the line l—c. In full throttle adjustment, the recess 122 does not project through the plane of the ports 116 to 119, and hence is not brought into communication therewith.

In general, it will be evident in the operation of the nozzle 16 that pressure reduction in the tube 59 and hence the injection period is initiated upon opening of the recess 138 to the port 133, that pressure restoration is initiated upon movement of the recess 135 from the port 129, and that the injection period is terminated upon movement of the recess 121 from the port 116. While I have disclosed one specific arrangement of ports and recesses and have described the operation for one phase adjustment, it is to be understood that the invention is intended to cover any arrangement which will effect opening and closing of the injection or metering valve through variation in the pressure impulses acting thereon, and over any suitable phase of the crank shaft rotation.

Thus, the plunger 115 is adjustable axially to vary the duration of injection, the starting point of injection remaining fixed. Since the fuel is supplied from a constant high pressure source, the fuel charge is metered very accurately. The phase relation of the starting point of injection to the crank shaft rotation is also susceptible of adjustment. Both adjustments of the plunger 115 may be effected during operation of the engine. Since a single control for all of the nozzles is provided, the adjustments for the nozzles are always synchronized.

The pressure drop in the control tubes 59 to 62 is limited, and preferably is from 25% to 40% of the maximum, or just sufficient to insure opening of the injection valves at the desired times. Any desired extent of pressure drop can be obtained. The pressure drop is also of short duration, and under most operating conditions the initial pressure is reestablished before the end of injection preparatory to closing the respective valves. As a result, the valves are closed quickly and positively. The momentum of the fluid in the control tubes prevents rebounding or reopening of the valves, and hence prevents dribbling after injection. The pins 51 serve to limit the travel of the valves 38. Adjustment of the extent of travel of any one valve 38 through adjustment of the corresponding pin 51 slightly varies the volume of fuel injected past said valve without influencing the volume of fuel injected past any of the other valves. Hence the pins 51 serve as a means for compensating for variations in the respective valves, such for example as variation in the diameters of the orifices 37, likely to result in practice due to manufacturing tolerances. The adjustments of the pins 51 may be effected while the engine is in operation.

The effect of leakage past any part subject to pressure differences is greatly minimized. Any leakage that might occur in the nozzles or in the distributor would not affect the amount of fuel injected.

In general, it will be evident that I have provided a highly advantageous fuel injection system which is efficient in operation and can be operated at unusually high speeds, and which is subject to an accurate and sensitive control. The construction is simple and inexpensive, and obviates many of the objections such as noise, wear, imperfect timing and metering, lack of synchronism, etc., inherent in many prior systems.

While I have herein shown the invention applied to a fuel injection system in which the fuel is injected under its own pressure, it is to be understood that the invention in its broad aspects is applicable generally to a fuel or fluid metering system. Such a metering system might be used for supplying fuel to an injection nozzle in which the actual injection is accomplished by separate means, such as an air blast, or for supplying fuel to engines operating on the Otto cycle, or for metering and distributing lubricating oils and other liquids, etc.

I claim as my invention:—

1. A fuel injection system, comprising, in combination, a source of liquid fuel under a substantially constant pressure, an injection nozzle having a reciprocable valve member, means for simultaneously directing fuel from said source at equal pressures to opposed ends of said valve member, and means operable in timed relation to said first mentioned means for partially dissipating the fluid pressure at one end of said valve member while maintaining the pressure at the other end of said valve member to effect movement of the latter from one position to the other.

2. A fuel injection system, comprising, in combination, a source of liquid fuel under pressure, an injection nozzle having a fluid pressure responsive valve member, and a rotary distributor for effecting the simultaneous supply of fuel from said source at equal pressures to opposed pressure areas on said member and for dissipating the pressure on one of said areas after a predetermined interval while substantially maintaining the pressure on the other of said areas to cause movement of said member from one position to another.

3. A fuel injection system comprising, in combination, a source of fuel under a constant pressure, an injection nozzle having a valve member with opposed pressure areas and having a discharge orifice opening from one of said areas, and means for directing fuel from said source at equal pressures simultaneously to said areas and for reducing after a predetermined interval the pressure on one of said areas while substantially maintaining the pressure on the other of said areas to effect movement of said valve member by the pressure acting on the other of said areas.

4. A fuel injection system comprising, in combination, a valve casing having an injection outlet, a reciprocable valve member having a lifting pressure face adapted to seat over said outlet and having an opposed seating pressure face, a passage opening constantly to said opposed pressure face, means constantly open to said passage for supplying fluid under pressure thereto, means for periodically directing fuel under pressure to said first mentioned face, and means operable over a predetermined period during the application of pressure to said first mentioned face to reduce the pressure acting on said opposed face below that acting on said lifting face to permit movement of said valve member into open position.

5. A fuel injection system comprising, in combination, a valve casing having an injection outlet, a reciprocable valve member having a pressure valve face providing a valve for said outlet and having an opposed pressure face, said faces being substantially equal in area, the effective area of said valve face being reduced by the area of said outlet when the latter is closed, a passage opening constantly to said opposed face, means constantly open to said passage for supplying fluid under pressure thereto, means for directing fuel under a pressure substantially equal to said fluid pressure to said valve face, and means for temporarily partially dissipating the pressure acting on said opposed face to effect opening of said outlet.

6. A fuel metering system comprising, in combination, a valve casing having a discharge duct, a reciprocable valve member having a pressure valve face adapted to open and close said duct and having an opposed pressure face, said faces being substantially equal in area, a source of fuel under a constant pressure, means for supplying fuel from said source to said opposed face, means for supplying fuel from said source to said valve face, and means for reducing the pressure on said opposed face while said last mentioned means is operative to effect movement of said valve member away from said duct into open position.

7. A fuel injection system comprising, in combination, a valve casing having a discharge duct, a reciprocable valve member having a pressure valve face adapted to open and close said duct and having an opposed pressure face, said faces being substantially equal in area, a source of fuel under a constant pressure, means for supplying fuel from said source to said opposed face, means for simultaneously supplying fuel from said source to said valve face, means for first reducing the pressure on said opposed face to effect movement of said valve member away from said duct into open position, and then for reestablishing the initial pressure on said opposed face, and spring means acting on said valve member to hold the latter in open position after the reestablishment of the pressure on said opposed face.

8. A fuel injection system comprising, in combination, a valve casing having a discharge duct, a valve member reversibly movable to open and close said duct, said member having two opposed pressure faces, means including a flow restricting orifice continuously in communication with one of said faces for feeding fluid under pressure thereto, means operable at timed intervals to supply fuel under pressure to the other of said faces, and means operable in timed relation to said last mentioned means to divert fluid under pressure from said first mentioned means at a point between said one valve face and said orifice.

9. A fuel injection system comprising, in combination, a valve casing having a discharge duct, a valve member reversibly movable to open and close said duct, said member having two opposed pressure faces, a source of fuel under pressure, means including a flow restricting orifice for feeding fuel from said source through said orifice to one of said faces, means operable at timed intervals over a fixed period to supply fuel from said source to the other of said faces, and means operable in timed relation to said last mentioned means during each period to divert from said first mentioned face fuel feeding past said orifice, said second mentioned means being adjustable relative to said last mentioned means to vary said relation.

10. A fuel injection system comprising, in combination, a valve casing having a discharge duct, a valve member reversibly movable to open and close said duct, said member having two opposed pressure faces, means including a flow restricting orifice continuously in communication with one face for feeding fluid under pressure thereto, means operable at timed intervals to supply fuel under pressure to the other face, and means including a flow restricting orifice larger than said first mentioned orifice and operable in timed relation to said last mentioned means to bleed fluid pressure feeding past said first mentioned orifice from said first mentioned means to effect a pressure reduction at said one face.

11. A fuel injection system comprising, in combination, a valve casing having a discharge duct, a valve member reversibly movable to open and close said duct, said member having two opposed pressure faces, means including a flow restricting orifice for feeding fluid under pressure to one of said faces, means operable over a fixed interval to supply fuel under pressure to the other of said faces, and by-pass means branching from said first mentioned means between said orifice and said one face and including a flow orifice and valve means operable at a predetermined point within said interval to open said by-pass means to bleed fluid under pressure from said first mentioned means through said last mentioned orifice.

12. A fuel injection system comprising, in combination, a valve casing having an injection outlet, a reciprocable valve member in said casing, said valve member having a pressure valve face adapted to coact with said outlet and having an opposed pressure face, a source of fuel under pressure, and means for directing fuel from said source to said casing against said faces to effect in sequence the application of equal pressures on said faces, a reduction in pressure on said opposed face permitting opening of said outlet, and a cut-off of pressure on said valve face permitting closing of said outlet.

13. A fuel injection system comprising, in combination, a valve casing having an injection outlet, a reciprocable valve member in said casing, said valve member having a pressure valve face adapted to coact with said outlet and having an opposed pressure face, a source of fuel under pressure, and means for directing fuel from said source to said faces to effect in sequence the simultaneous application of full pressure on each of said faces, a reduction in pressure on said opposed face permitting opening of said outlet, a reestablishment of the full pressure on said opposed face, and a reduction in pressure on said valve face permitting closing of said outlet.

14. A fuel injection system comprising, in combination, a valve casing having an injection outlet, a reciprocable valve member in said casing, said valve member having a pressure valve face adapted to coact with said outlet and having an opposed pressure face, a source of fuel under pressure, and means for directing fuel from said source to said valve member to effect in timed sequence the application of equal pressures to said faces, a reduction in the pressure on said opposed face, and a cut-off of the fuel under pressure acting on said valve face, said means being adjustable to vary the point of cut-off relative to the point of pressure reduction.

15. A fuel injection system comprising, in combination, a plurality of valve casings, each having an injection outlet, a plurality of fluid pressure responsive valve members, one reciprocable in each casing and controlling the opening through the allotted outlet, a source of fuel under pressure, a plurality of control lines connecting said source respectively to said casing for directing fuel against one face of each valve member, a plurality of by-pass lines one from each control line, a plurality of feed lines for directing fuel respectively to said casing against the other face of each valve member, and rotary means for connecting said feed lines in timed sequence to said source and for venting said by-pass lines in a similarly timed sequence to a relatively low pressure, with the connection of the feed line and the venting of the by-pass line for each casing being concurrent over a predetermined period, said rotary means being adjustable to vary said period.

16. A fuel injection system comprising, in combination, a valve casing having an injection outlet, a fluid pressure responsive valve member movable in opposite directions to open and close said outlet, said valve member having opposed pressure faces, means for supplying fluid under pressure to one of said faces, means for supplying fuel under pressure to the other of said faces and to said outlet at predetermined intervals, a by-pass line opening from said first mentioned means, said by-pass line including a restricted drain orifice, and valve means for opening and closing said line, said valve means being timed with respect to said second mentioned means to open said by-pass line during the supply of fuel to said other pressure face and thereby to effect a pressure reduction in said first mentioned means causing opening of said valve member.

17. A fuel injection system for an internal combustion engine with a crank shaft, said system comprising, in combination, a plurality of injection nozzles, each nozzle comprising a casing with an injection outlet and a reciprocable valve member with inner and outer pressure faces, each inner face controlling the allotted outlet, a source of fuel under pressure, a plurality of control tubes for directly connecting said source respectively to said casings to direct fuel against said outer faces, individual adjustable valve means in said control tubes, a plurality of feed tubes for supplying fuel to said casings against said inner faces, and a rotary distributor operable from said crank shaft for connecting said feed tubes in timed sequence to said source and for venting the pressure from said control tubes in timed sequence over an interval concurrent with the supply of fuel to the companion feed tubes.

18. A fuel injection system comprising, in combination, an injection nozzle having a reciprocable valve member, a reservoir of substantial capacity containing liquid fuel under a constant pressure, means for supplying fuel to said reservoir, and a rotary distributor separate of said reservoir for controlling the supply of fuel from said reservoir to opposite ends of said valve member to move the latter into open position and after a predetermined interval to return the latter to closed position, said distributor being adjustable to vary the duration of said interval over a finely graduated range from zero to maximum.

19. A fuel injection system comprising, in combination, a source of fuel under pressure, an injection nozzle having a reversibly movable valve member with opposed pressure areas and having a discharge orifice opening from one of said areas, and power means operable to effect the application of fuel from said source at a predetermined high pressure to the other of said areas and periodically to simultaneously establish an uninterrupted passage for the flow of fuel between said source and said one area, and then operable to relieve the pressure acting on said other area while maintaining said passage so as to lift said valve member and supply fuel to said orifice.

20. A fuel injection system comprising, in combination, a valve casing having a discharge orifice, a reciprocable valve member having a pressure valve face adapted to open and close said orifice and having an opposed pressure face, said faces being substantially equal in area, a source of fuel under pressure, means for supplying fuel from said source to said opposed face, means for simultaneously supplying fuel from said source to said valve face, and means for first reducing the pressure on said opposed face to effect movement of said valve member away from said orifice into open position, and then re-establishing the initial pressure on said opposed face, said second mentioned means being operable to reduce the pressure on said valve face after said re-establishment of pressure on said opposed face to effect movement of said valve member into position to close said orifice.

21. In a fuel injection system, in combination, a plurality of fluid pressure operable valves, each valve having a reciprocable valve member with lifting and seating areas respectively at opposite ends, a plurality of feed tubes having inlet feed ports and opening respectively to said valves in communication with said lifting areas, a plurality of control tubes having control ports and opening respectively to said valves in communication with said seating areas, a source of fuel under pressure, rotary distributor valve passages for connecting said source sequentially over predetermined periods through said feed ports to said respective feed tubes, means for supplying fluid under pressure to said control tubes and including rotary distributor valve passages cooperating with said control ports for effecting pressure fluctuations in timed sequence in said respective control tubes and in overlapping relation to said periods of fuel supply to said feed tubes to effect opening and closing of said valves, and means for rotating said first and second mentioned passages in unison relatively to said feed and control ports respectively.

CARROLL R. ALDEN.